United States Patent Office 2,894,012
Patented July 7, 1959

2,894,012

GRIGNARD REACTIONS IN PRESENCE OF CYCLIC ETHERS

Hugh E. Ramsden, Metuchen, and Sanders D. Rosenberg, Plainfield, N.J., assignors to Metal & Thermit Corporation, New York, N.Y., a corporation of New Jersey No Drawing. Application November 28, 1955
Serial No. 549,556

6 Claims. (Cl. 260—448.2)

This invention relates to a method of preparing organosilanes.

Aryl halosilanes have been prepared, heretofore, by the direct reaction of chlorobenzene with silicon-copper and silicon-silver alloys. This method, however, has produced only poor yields and cannot be extended to reactions with the more complicated aryl chlorides. Other prior methods of making aryl halosilanes involve the reaction of benzene with silicon tetrachloride or silicochloroform at high temperatures and pressures. These methods have been found to give only the monosubstituted material in economic yields and utilize costly high temperature and pressure equipment. Phenyl magnesium chloride and arylmagnesium bromides in hazardous ethyl ether have been used to form aryl silanes, but this method is not economically useful for groups other than phenyl. This invention relates to an economical, efficient process for preparing organosilanes by the reaction of an organomagnesium chloride reagent with a silicon compound such as a silicon tetrahalide, silicochloroform, dichlorosilane, organic orthosilicates or organohalosilanes. It is applicable to the preparation of many new organosilanes which could not be made by prior art methods.

The organosilanes prepared by the present process may be described by the following general formula:

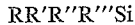

wherein R is selected from the group consisting of aryl, vinylic and active-hydrogen-free heterocyclic radicals, and R', R" and R''' may be selected from the group consisting of aryl, vinylic, hydrogen, alkyl, alkoxy, aryloxy, active-hydrogen-free heterocyclic and halide radicals. Wherever used in this application the term "vinylic" radical denotes the vinyl radical, $CH_2=CH-$, and the related radicals in which one or more of the hydrogens have been substituted by hydrocarbon groups or by aliphatic or aromatic radicals containing functional groups inert to magnesium and to vinylic-magnesium chloride. By the term "active-hydrogen-free heterocyclic" radicals we mean all heterocyclic radicals except those containing hydrogen attached to nitrogen or oxygen, or containing other groups reactive to RMgCl. The above class of compounds includes but is not limited to aryltrihalosilanes, vinylic trihalosilanes, methylvinyldihalosilanes, ethylvinyldihalosilanes, biphenylylhalosilanes, methylvinyldiethoxysilane, phenylvinyldihalosilanes, diaryldihalosilanes, aryldihalosilanes, vinyldihalosilanes, tetravinylsilanes, bispentachlorophenyldihalosilanes, 2-pyridyltrihalosilanes, bis-(2,6 or 8-quinolyl) dihalosilanes, trithienylhalosilanes, 4 (or 6) halo-6(or 4)-pyrimidyltrimethylsilanes, etc.

In accordance with the present invention, the aforedefined class of organosilanes is prepared by reacting an organomagnesium chloride reagent selected from the class consisting of arylmagnesium chloride, vinylic magnesium chloride and active-hydrogen-free heterocyclic magnesium chloride with a silicon compound. The silicon compound may be described by the following general formula:

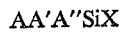

wherein X is halogen, alkoxy, aryloxy; A, A' and A" are the same or different and may be hydrogen, alkyl, aryl, halogen, alkoxy or aryloxy. Some examples of the silicon compound are: silicon tetrahalides, silicochloroform, organic orthosilicates and organohalosilanes. Suitable organohalosilanes are alkylhalosilanes, arylhalosilanes, alkylarylhalosilanes, vinylic halosilanes, arylvinylic halosilanes, alkoxysilanes and aryloxysilanes. The silicon compound may be more specifically exemplified by alkyltrichlorosilane ($RSiCl_3$), alkylhydrodichlorosilane ($RHSiCl_2$), aryltrichlorosilane ($RSiCl_3$), dialkyldichlorosilane ($R_2SiCl_2$), diaryldichlorosilane ($R_2SiCl_2$), vinylic trichlorosilane, divinylic dichlorosilane, trialkyl monochlorosilane, triarylmonochlorosilane, etc. The organomagnesium chloride reactant is prepared in the presence of a compound Q, hereinafter defined, which may act as a solvent therefor. The solution of the reagent so prepared is subsequently allowed to react with a silicon compound selected from the above defined group, preferably dissolved in a hydrocarbon solvent, to form an organosilane. The magnesium chloride salt cake is separated from the organosilane solution, by filtration or otherwise, and the solvents are removed from the reaction mixture by distillation.

Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. Permissible substitutions are groups which are not reactive with organomagnesium chlorides, or with any of the other components and products of the reaction mixtures of the present process, and includes substituted and unsubstituted alkyl, aryl, alkoxy and aryloxy groups (all allowable substitutes being those unreactive to other components of the reaction mixture as specified hereinbefore). Where nitrogen replaces a carbon atom, hydrogen on the nitrogen atom must be substituted with a group unreactive to the reactants or reaction products. A further requirement for Q is that the oxygen must be available for electron donation, i.e., the free p-electrons present on the oxygen should be available for coordination with the organomagnesium chloride. Any large blocking groups in the 2 and 5 (6) position may restrict the availability of these electrons. Another way these electrons may be restricted in their availability is by p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium. Since Q also apparently functions as a solvent, a Q which has a high melting point may still function in this invention, but if it is used as solvent, obviously the high melting point (e.g., above 90° C.) causes great difficulty in carrying out the reaction. Any liquid Q of any structure whatsoever (with the limitations specified hereinbefore) will work.

The compound, employed to promote reaction and to form a complex with the vinylic, heterocyclic or aryl magnesium chloride may be a simple 5 or 6 member heterocyclic compound containing one oxygen in the ring and having the requisite characteristics set forth above, e.g., tetrahydrofuran, tetrahydropyran, dihydropyran, etc. It may also be a 5 or 6 member heterocyclic compound containing one oxygen in the ring and further substituted by monovalent groups and having said characteristics, e.g., 2-methyltetrahydrofuran, 2-ethoxytetrahydrofuran, tetrahydrofurfuryl ethyl ether, N-methyl morpholine, etc.

The reaction sequence for the formation of the present organosilanes can be illustrated by the following:

(1) $Ra(RMgCl) + R'_n SiCl_{4-n} \rightarrow$
$R_a R'_n SiCl_{4-(n+a)} + a(MgCl_2)$ wherein R is selected from the class consisting of aryl, vinylic and active-hydrogen-free heterocyclic radicals, R' is a monovalent radical selected from the class consisting of alkyl, aryl, vinylic and active-hydrogen-free heterocyclic radicals and hydrogen, $a$ is an integer from 1 to 4, $n$ has a value of 0 to 3 and $a+n$ has a maximum value of 4. When $n$ has a value of 2 or 3, R' may represent more than one monovalent radical, such as an alkyl and an aryl radical; alkyl, aryl, and vinylic radicals; hydrogen, vinylic and aryl radicals; etc., thereby yielding organosilanes represented by the formula $RR'R''R'''Si$, as defined above. The chlorine radical or radicals in $R'_n SiCl_{4-n}$ can be replaced by OR'' where R'' is an alkyl or aryl radical or by other halogen atoms. The reaction product represented by $R_a R'_n SiCl_{4-(n+a)}$ may be and usually is a mixture of organosilanes. It is evident that by varying the number of moles of RMgCl per mole of $R'_n SiCl_{4-n}$ it is possible to vary the number of chlorines replaced by R. Even with the same ratio of reactants however one may obtain a mixture of products whose sum is represented by the formula $R_a R'_n SiCl_{4-(n+a)}$.

For example, if we allow two moles of RMgCl to react with one mole of $R'SiCl_3$ either of the following reactions may take place, or both may go on simultaneously, at the same or at different rates:

(2) $2RMgCl + R'SiCl_3 \rightarrow R_2 R'SiCl + 2MgCl_2$ — or (3) $2RMgCl + R'SiCl_3 \rightarrow \frac{1}{2} R_3 R'Si + \frac{1}{2} RR'SiCl_2 + 2MgCl_2$ The products which may be obtained from reactions of various silicon reagents with varying amounts of RMgCl is illustrated by the following:

(4) $RMgCl + SiCl_4 \rightarrow RSiCl_3 + R_2 SiCl_2 + R_3 SiCl + R_4 Si$ (5) $RMgCl + R'SiCl_3 \rightarrow RR'SiCl_2 + R_2 R'SiCl + R_3 R'Si$ (6) $RMgCl + R'_2 SiCl_2 \rightarrow RR'_2 SiCl + R_2 R'_2 Si$ (7) $RMgCl + R'R''SiCl_2 \rightarrow RR'R''SiCl + R_2 R'R''Si$ (8) $RMgCl + R'_3 SiCl \rightarrow RR'_3 Si$ (9) $RMgCl + R'_2 R''SiCl \rightarrow RR'_2 R''Si$

(10) $RMgCl + R'R''_2 SiCl \rightarrow RR'R''_2 Si$

(11) $RMgCl + R'R''R'''SiCl \rightarrow RR'R''R'''Si$

Thus, silicon tetrachloride may yield a mixture of monochloro-, dichloro-, trichlorosilanes and tetraorgano silane, as illustrated in Equation 4. When utilizing trichlorosilane as the silicon reactant, a mixture of the di-chloro-, monochlorosilane and triorganohydrosilane may result as shown in Equation 5. Similarly, a mixture of monochlorosilane and tetraorganosilane may be formed when utilizing the dichloro silane as the silicon reactant as illustrated in Equations 6 and 7. A single tetra organosilane can be obtained when using a monochlorosilane as the silicon reactant, as shown in Equations 8 to 11 inclusive. The relative proportions of the various organosilanes found in the mixtures of silanes can be influenced by varying the amount of the reactants and/or the conditions of reaction.

The organomagnesium chloride reagents utilized in this invention are prepared by allowing aryl, vinylic or active-hydrogen-free heterocyclic chlorides to react with magnesium in the presence of a compound Q, as more fully disclosed in copending applications Ser. Nos. 549,560, 549,517, 549,545, all filed November 28, 1955, and now abandoned. In the formation of these reagents, it is desirable to utilize about three molar equivalents of the compound Q per mole equivalent of the aryl, vinylic or active-hydrogen-free heterocyclic chloride. It may be further desirable to dilute the compound Q solution of the reagent with additional equivalents of compound Q in order to maintain a mobile solution.

An inert hydrocarbon solvent may be used for the reaction of the organomagnesium chloride reagent with the silicon reactant. While most inert hydrocarbon solvents are utilizable in the present invention, aliphatic hydrocarbon solvents distilling below 150° C. are generally preferred. It is preferred that the amount of hydrocarbon solvent should be about one liter of the hydrocarbon solvent per mole of salt formed. The solvent can be readily removed from the reaction mixture by distillation.

The reaction between the organomagnesium chloride reagent and silicon reactant is preferably carried out at a temperature of about 40–80° C., and is obtained by slowly adding, with efficient agitation, the compound Q solution of the reagent to the hydrocarbon solution of the silicon reactant. For $R_4Si$ compounds, reverse addition is also possible. It is further preferred to carry out the reaction in an inert atmosphere such as that provided by nitrogen.

The reaction of the magnesium with the aryl, vinylic, or active-hydrogen-free heterocyclic chloride in the presence of the compound Q solvent is carried out at reflux temperatures over a period of a few hours, although lower temperatures, of course, may be used.

The following examples are further illustrative of the present invention, but it shall be understood that the invention is not limited thereto.

*Example I*

Magnesium turnings (2 g. atoms—48.9 g.) were placed in a one liter flask fitted with a dropping funnel and reflux condenser. Twenty-five ml. of a solution of chlorobenzene in tetrahydrofuran [245.2 g. (2.0 moles) of chlorobenzene in 432 g. (6.0 moles) of tetrahydrofuran] were added to the magnesium. The mixture was agitated and a small crystal of iodine and 1 ml. of ethyl bromide were added thereto to initiate the reaction, meanwhile heating the reaction flask until a black color developed. Heating was then stopped, and the remainder of the chlorobenzene-tetrahydrofuran solution was added through the dropping funnel at a rate sufficient to maintain vigorous reflux. Upon completion of this addition, the solution was heated and refluxed for three hours. Tetrahydrofuran (3.0 moles—216 g.) was added to the reaction mixture in order to maintain a mobile solution of the phenyl magnesium chloride.

Silicon tetrachloride (0.9 mole—153 g.) and a hydrocarbon solvent (2 liters—B.P. 90–110°) were placed in a 5 liter flask equipped with a dropping funnel, stirrer, and reflux condenser. The phenylmagnesium chloride solution prepared above was added dropwise with agitation to the reaction mixture. Upon completion of addition, the mixture was heated and refluxed for three hours. The mixture was then filtered, and the solid residue washed with two portions (250 ml. each) of hydrocarbon solvent. All the filtrates were combined. All of these operations were performed in a nitrogen atmosphere.

The solvents were removed by distillation, and the residue subjected to vacuum distillation. A yield of diphenyldichlorosilane (162.9 g.—61.5%) distilling at 97–118° C. (0.1–0.7 mm) plus small amounts of phenyltrichlorosilane and triphenylchlorosilane were obtained.

*Example II*

Benzene hexachloride (0.5 mole—142.4 g.), magnesium turnings (2.0 g. atoms—48.7 g.) and tetrahydrofuran (200 ml.) were placed in a 3 liter flask fitted with an anchor stirrer, a reflux condenser of large capacity and an additional inlet for solids. While the mixture was vigorously agitated, a small iodine crystal and ethyl bromide (1.0 ml.) were added to said reaction mixture and heat was applied until a faint green color developed, indicative of initiation of the reaction. Heating was then stopped and the flask was immersed in a cold water bath to dissipate the heat developed as a result of the vigorous reaction which occurs upon initiation thereof. After the vigorous reaction ceased, tetrahydrofuran (500 ml.) was added to the cooled reaction mixture. The rest of the benzene hexachloride (1.5 moles—427.2 g.) was subsequently added in 50 g. batches. After all of the benzene hexachloride had been added, the bath was removed and the pentachlorophenylmagnesium chloride mixture was refluxed for one hour.

Silicon tetrachloride (3.0 moles—510 g.) and a hydrocarbon solvent (2 l.—B.P. 90–110° C.) were placed in a 5 l. flask equipped with a stirrer, reflux condenser and dropping funnel. The pentachlorophenylmagnesium chloride solution prepared above was added through the dropping funnel over a 2.5 hour period with efficient agitation. After all of the reagent solution had been added, the mixture was refluxed for 6 hours. The mixture was filtered and the solid residue washed with two portions (250 ml. each) of a hydrocarbon solvent and all the filtrates were combined. All of the above operations were carried out in a nitrogen atmosphere.

The solvents were removed by distillation. The solid residue was extracted with hydrocarbon solvent (B.P. 90–110° C.) for 48 hours in a Soxhlet extraction apparatus, yielding pentachlorophenyltrichlorosilane (160.0 g.—21%) melting at 257–260° C.

Example III

A 1500 ml. solution of vinylmagnesium chloride (2 moles) in tetrahydrofuran, and a 1450 ml. solution of silicon tetrachloride (2 moles) in hydrocarbon solvent were added to a flask, with stirring, at equal rates. It took about four hours to completely add the vinylmagnesium chloride. The apparatus was then flushed with petroleum ether and the slurry was filtered in a nitrogen atmosphere. A small amount of hydroquinone dimethyl ether was added to the reaction product, and on distilling, analysis showed a yield of 56.08% of mixed vinyl silanes.

Example IV

A solution of 2000 ml. of vinylmagnesium chloride (2 moles) in tetrahydrofuran, and a solution of 2000 ml. of silicon tetrachloride (4 moles) in petroleum ether were added simultaneously, with stirring, to a flask which had been previously flushed with dry nitrogen gas, as in Example I.

The reaction product was filtered in a dry nitrogen atmosphere using petroleum ether for washing. On distilling, analysis showed a yield of 42.26% vinyl silanes.

Example V

A liter solution containing 1.0 mole of vinylmagnesium chloride in tetrahydrofuran was added to a flask as in Example III with a liter solution of methyl trichlorosilane 298.94 grams (2 moles) in petroleum ether. The addition was completed in about two and a half hours. The reaction product was heated for a short time and then filtered in a dry nitrogen atmosphere. On distilling, analysis indicated a yield of 43.8% vinyl silanes, of which 13.2% was methylvinyldichlorosilane.

Example VI

In an atmosphere of dry nitrogen, petroleum ether (2250 ml.), cadmium chloride (18 grams), tetrahydrofuran (250 ml.), and methyl trichlorosilane 538.09 grams (3.6 moles), in that order, were added to a flask. The temperature was maintained at about 3° C. and stirring was applied. Vinylmagnesium chloride (1.8 moles) was added slowly to this solution. In about five and a half hours, the addition was completed. The temperature had risen to 20° C. The product was filtered and then distilled. A yield of 59.5% vinyl silanes was recovered, of which 23.6% was methylvinyldichlorosilane.

Example VII

Tetrahydrofuran (1500 ml.), a hydrocarbon solvent (500 ml.) and silicon tetrachloride 339.78 grams (2 moles) were placed in a flask previously flushed with dry nitrogren. The solution was cooled to about 1.5° C. with an ice bath, and a vinylmagnesium chloride solution (2 moles in 753.5 ml.) was added dropwise. Stirring was then applied. The addition was completed in about seven hours, with the temperature controlled between 1.5°–2.0° C. The reaction mixture was allowed to reach room temperature with continued stirring, and then the mixture was filtered in a dry nitrogen atmosphere. On distilling, 54.32% vinyl silanes were recovered, of which 9.27% was vinyl trichlorosilane.

Example VIII

Tetrahydrofuran (655 ml.), a hydrocarbon solvent (220 ml.), and silicon tetrachloride 148.6 grams (0.875 mole) were added to a flask. The temperature of the solution was controlled at about 2° C. by means of an ice bath. Stirring was applied. Vinylmagnesium chloride solution (0.875 mole in 330 ml.) was slowly added. The addition was completed in about six hours, and the reaction mixture was allowed to reach room temperature. The stirring was discontinued and the product filtered in a dry nitrogen atmosphere. After distillation, a yield of 48.82% vinyl silanes was recovered, of which 12.18% was vinyltrichlorosilane.

Example IX

A hydrocarbon solvent (1850 ml.), silicon tetrachloride 679.56 grams (4 moles) and tetrahydrofuran (150 ml.) were added in that order to a flask which was previously flushed with dry nitrogent gas. An ice bath was applied to the flask and stirring of the solution was begun. Vinylmagnesium chloride solution 738 ml. (2 moles) was slowly added, the temperature being controlled at about 2° C. The vinylmagnesium chloride was completely added in about seven and a half hours. The reaction mixture was cooled for another hour, after which it was allowed to reach room temperature. The reaction mixture was then refluxed for about two and a half hours, the temperature reaching as high as 82° C. The stirring was discontinued and the mixture was cooled. The reaction product was then filtered in a dry nitrogen atmosphere and the liquid distilled. The yield of vinyl silanes was 42%.

Example X

Petroleum ether (1600 ml.), tetrahydrofuran (135 ml.) and silicon tetrachloride 58.9 grams (0.3468 mole) were added to a flask previously flushed with dry nitrogen gas. Vinylmagnesium chloride solution 640 ml. (1.734 moles) was slowly added, stirring was applied, and the mixture refluxed at about 43° C. for five hours. Then, both stirring and heating were discontinued. The product was diluted with about 4 liters of water to which was added concentrated hydrochloric acid (150 ml.) in 1 liter of water. The organic layer, of the two layers formed, was separated and filtered through anhydrous sodium sulfate. The water layer was extracted with petroleum ether (500 ml.), separated and the combined organic layers filtered through anhydrous sodium sulfate. Upon distilling the organic layers, there was a 70% yield of tetravinylsilane.

Example XI p-Chlorophenylmagnesium chloride was prepared from p-dichlorobenzene 294 grams (2.0 moles), magnesium 48.7 grams (2.0 gram atoms), and tetrahydrofuran 432.0 grams (6.0 moles).

Silicon tetrachloride 157 grams (0.9 mole) and two liters of a hydrocarbon solvent were placed in a 5 liter flask, and the p-chlorophenylmagnesium chloride solution was added over a two hour period. The mixture was refluxed for three hours. The solution was filtered and solvents removed by distillation. Vacuum distillation showed 28.8% crude bis-p-chlorophenyldichlorosilane.

*Example XII*

Flask was charged with 48.7 grams (2.0 gram atoms) of magnesium and a crystal of iodine. To this was added part of a mixture (25 ml.) of p-dichlorobenzene 294 grams (2.0 moles) in tetrahydrofuran 432 grams (6.0 moles). Stirring and heating were applied to the mixture and at reflux ethyl bromide (1 ml.) was added. The heating was discontinued and the remainder of the mixture was added. The solution was allowed to reflux for two hours longer.

Trimethylchlorosilane 115 grams (1.05 moles) in one liter of a hydrocarbon solvent was added and the mixture was allowed to reflux for three hours more. Dilute hydrochloric acid (2 liters) were used to hydrolyze the reaction mixture. The layers were separated and the organic layer concentrated by distillation. After vacuum distillation, a yield of 87.5% of trimethyl-p-chlorophenylsilane was obtained.

*Example XIII*

Vinyltrichlorosilane 324 grams (2.0 moles), tetrahydrofuran (250 ml.), and petroleum ether (1750 ml.) were placed in a flask. Over a four hour period, phenylmagnesium chloride (2.0 moles) in tetrahydrofuran (500 ml.) was added to the mixture. The mixture was then refluxed for four hours longer. After filtering and distilling, the residue was vacuum distilled to yield 56% of phenylvinyldichlorosilane.

*Example XIV*

Over a three hour period, phenylmagnesium chloride (1.0 mole) in tetrahydrofuran (350 ml.) was added to a mixture of vinyltrichlorosilane 162 grams (1.0 mole) in one liter of a hydrocarbon solvent. Stirring was applied to the mixture. After filtering, and distilling off solvents, the reaction product was vacuum distilled. A yield of 44.8% phenylvinyldichlorosilane was obtained.

*Example XV*

Phenylmagnesium chloride (2.0 moles) in tetrahydrofuran was added over a two hour period to a mixture of silicon tetrachloride 340 grams (2.0 moles) in a hydrocarbon solvent (1750 ml.), and tetrahydrofuran (250 ml.). A cold water bath was kept around the reaction flask during this addition, but was removed after all the phenylmagnesium chloride was added. Refluxing was then maintained for three hours after which the mixture was filtered and the solvents removed by distillation. By vacuum distillation, a yield of 38% phenyltrichlorosilane was obtained.

*Example XVI*

Phenylmagnesium chloride (2.0 moles) in tetrahydrofuran (900 ml.) was added over a two hour period to silicon tetrachloride (2.2 moles) in a hydrocarbon solvent (2000 ml.). During the addition, the flask was maintained in a cold water bath. The mixture was then refluxed for four hours, after which it was filtered and distilled. The residue, upon vacuum distillation, showed a 38% yield of phenyltrichlorosilane.

*Example XVII*

Phenylmagnesium chloride (2.0 moles) in tetrahydrofuran (1000 ml.) was added over a two hour period to silicon tetrachloride (2.2 moles) in a hydrocarbon solvent (2000 ml.) producing a reaction temperature between 40° and 50° C. The mixture was then refluxed for two more hours, after which it was filtered, distilled to remove the solvents, and vacuum distilled to produce phenyltrichlorosilane. A 46.9% yield was obtained.

*Example XVIII*

Phenylmagnesium chloride (1.0 mole) was added over a period of several hours to silicon tetrachloride (2.0 moles) in a hydrocarbon solvent (1 liter). No temperature control was attempted. After the addition was completed, refluxing was maintained for five hours. After filtering the mixture and distilling off the solvents, fractional distillation of the residue produced a 46.7% yield of phenyltrichlorosilane.

*Example XIX*

The reaction was carried out as in Example XVIII except that the phenylmagnesium chloride mixture was added to the silicon tetrachloride at −10° C. The addition took five hours for completion. With similar vacuum distillation steps, 39.7% phenyltrichlorosilane was obtained.

*Example XX*

Phenylmagnesium chloride (2.0 moles) was added dropwise over a two hour period to a flask containing silicon tetrachloride 372 grams (2.19 moles), a hydrocarbon solvent (1750 ml.) and tetrahydrofuran (250 ml.). The reaction mixture was refluxed for five hours, after which the solution was filtered, and the solvents removed by distillation. Vacuum distillation of the residue showed a 44.4% yield of phenyltrichlorosilane.

Throughout the specification RMgCl has been used to designate the respective Grignard reagents used in the various reactions. It is to be understood, however, that in each instance the complex RMgCl·nQ may be substituted for RMgCl. In this complex R has the same value defined above following Equation 1, Q has the same significance ascribed to it above and $n$ is a small number of the order of 1 to 3.

We have described what we believe to be the best embodiments of our invention. We do not wish, however, to be confined to the embodiments shown, but what we desire to cover by Letters Patent is set forth in the appended claims.

What is claimed by Letters Patent is:

1. A method of preparing organosilanes which comprises reacting, at a temperature of about 20 to 80° C., a compound Q solution of an organomagnesium chloride reagent selected from the class consisting of arylmagnesium chlorides, vinylic magnesium chlorides, active-hydrogen free heterocyclic magnesium chlorides with a silicon compound of formula AA'A"SiX, wherein X is selected from the group consisting of halogen and OR groups, A, A' and A" are the same or different from each other, and are selected from the class consisting of hydrogen, hydrocarbon groups, halogen and OR groups, wherein R is a hydrocarbon radical in the presence of an inert hydrocarbon solvent, and recovering said silanes, said compound Q being an ether containing from 5 to 6 atoms in the ring and wherein (a) there is only one oxygen atom in the ring, (b) the other ring atoms are carbon, (c) one ring carbon separated from the oxygen atom in the ring by two carbon atoms may be replaced by an alkyl substituted nitrogen atom, (d) the ring contains not more than one double bond, (e) at least one carbon atom adjacent the oxygen atom in said ring being free of any substituents other than hydrogen, (f) said ether contains no substituent which reacts with organomagnesium chlorides or with other components or products of the reaction mixture.

2. The process of claim 1 in which a compound Q solution of phenylmagnesium chloride is reacted with silicon tetrachloride and diphenyldichlorosilane is recovered.

3. A method of preparing diphenyldichlorosilane which comprises reacting at a temperature of between about 20 to 80° C. a tetrahydrofuran solution of phenylmagnesium chloride with silicon tetrachloride, and recovering diphenyldichlorosilane.

4. A method of preparing diphenyldichlorosilane which comprises mixing at a temperature of between about 20 to 80° C. a solution of phenylmagnesium chloride in tetrahydrofuran with a solution of silicon tetrachloride in a hydrocarbon solvent, refluxing the mixture, and recovering diphenyldichlorosilane.

5. A method according to claim 1 wherein Q is tetrahydrofuran.

6. A method according to claim 1 wherein Q is selected from the class consisting of tetrahydrofuran, tetrahydropyran, 2-methyltetrahydrofuran, 2-ethoxytetrahydropyran, tetrahydrofurfuryl ethyl ether, dihydropyran, and N-methylmorpholine.

References Cited in the file of this patent

UNITED STATES PATENTS

| | | |
|---|---|---|
| 2,654,771 | Stelling et al. | Oct. 6, 1953 |
| 2,698,334 | Rust et al. | Dec. 28, 1954 |

FOREIGN PATENTS

| | | |
|---|---|---|
| 618,403 | Great Britain | Feb. 21, 1949 |
| 622,970 | Great Britain | May 10, 1949 |

OTHER REFERENCES

Hepworth: "Jour. Chemical Society" (London), vol. 119, part 2 (1921), pp. 1249–56.

Kharasch et al.: "Grignard Reactions of Nonmetallic substances," Prentice-Hall, Inc., New York (October 1954), pp. 24, 49–50, 1306–1309.